United States Patent
Lin

[11] Patent Number: 5,979,925
[45] Date of Patent: Nov. 9, 1999

[54] BICYCLE HEAD TUBE PACKING ARRANGEMENT

[76] Inventor: Wen-Hwa Lin, No. 816, Chan Shen Rd., Tian Shan Chun, Wei Pu Hsiang, Taichung Hsien, Taiwan

[21] Appl. No.: 09/053,488

[22] Filed: Apr. 2, 1998

[51] Int. Cl.[6] .................................................. B62K 1/00
[52] U.S. Cl. ................................... 280/279; 384/545
[58] Field of Search .......................... 280/279, 280, 280/274; 384/540, 545

[56] References Cited

U.S. PATENT DOCUMENTS

| 5,544,905 | 8/1996 | Chen | 280/279 |
|---|---|---|---|
| 5,634,727 | 6/1997 | Lin et al. | 384/545 |
| 5,681,119 | 10/1997 | Marui | 384/545 |
| 5,823,556 | 10/1998 | Chi | 280/279 |

*Primary Examiner*—Robert J. Oberleitner
*Assistant Examiner*—Daniel Yeagley
*Attorney, Agent, or Firm*—Varndell & Varndell, PLLC

[57] ABSTRACT

A bicycle head tube packing arrangement includes a head tube, a hexagon head sleeve fixed to the inside of the head tube, a tubular shaft inserted through the hexagon head sleeve with both ends respectively fastened to a handlebar stem and a front fork, a nut threaded onto an outer thread on the tubular shaft to hold a first axle bearing around the tubular shaft below a lower collar on the tubular shaft, a screw cap threaded onto an inner thread at the top of the head tube to hold a second axle bearing around the tubular shaft above an upper collar on the tubular shaft.

1 Claim, 5 Drawing Sheets

BICYCLE HEAD TUBE PACKING ARRANGEMENT

BACKGROUND AND SUMMARY OF THE INVENTION

The present invention relates to a bicycle head tube packing arrangement, and more particularly to such a bicycle head tube packing arrangement which is simple in structure, and can be conveniently installed without causing the hands to be covered with dirt.

FIG. 1 shows a bicycle head tube packing arrangement in which two packing devices are respectively mounted on top and bottom ends of the head tube to hold a respective axle bearing, enabling a shaft to be supported on the axle bearings and connected between a front fork and a handlebar stem. Because the packing devices are respectively comprised of a number of parts, the installation procedure of the packing devices is complicated. Furthermore, the hands tend to be covered with dirt during the installation of the packing devices.

It is one object of the present invention to provide a bicycle head tube packing arrangement which has a simple structure. It is another object of the present invention to provide a bicycle head tube packing arrangement which can be conveniently installed without causing the hands to be covered with dirt. To achieve these and other objects of the present invention, there is provided a bicycle head tube packing arrangement which comprises a head tube, a hexagon head sleeve fixed to the inside of the head tube, a tubular shaft inserted through the hexagon head sleeve with both ends respectively fastened to a handlebar stem and a front fork, a nut threaded onto an outer thread on the tubular shaft to hold a first axle bearing around the tubular shaft below a lower collar on the tubular shaft, a screw cap threaded onto an inner thread at the top of the head tube to hold a second axle bearing around the tubular shaft above an upper collar on the tubular shaft.

DETAILED DESCRIPTION OF THE PREFERRED EMBODIMENT

Figure 1:
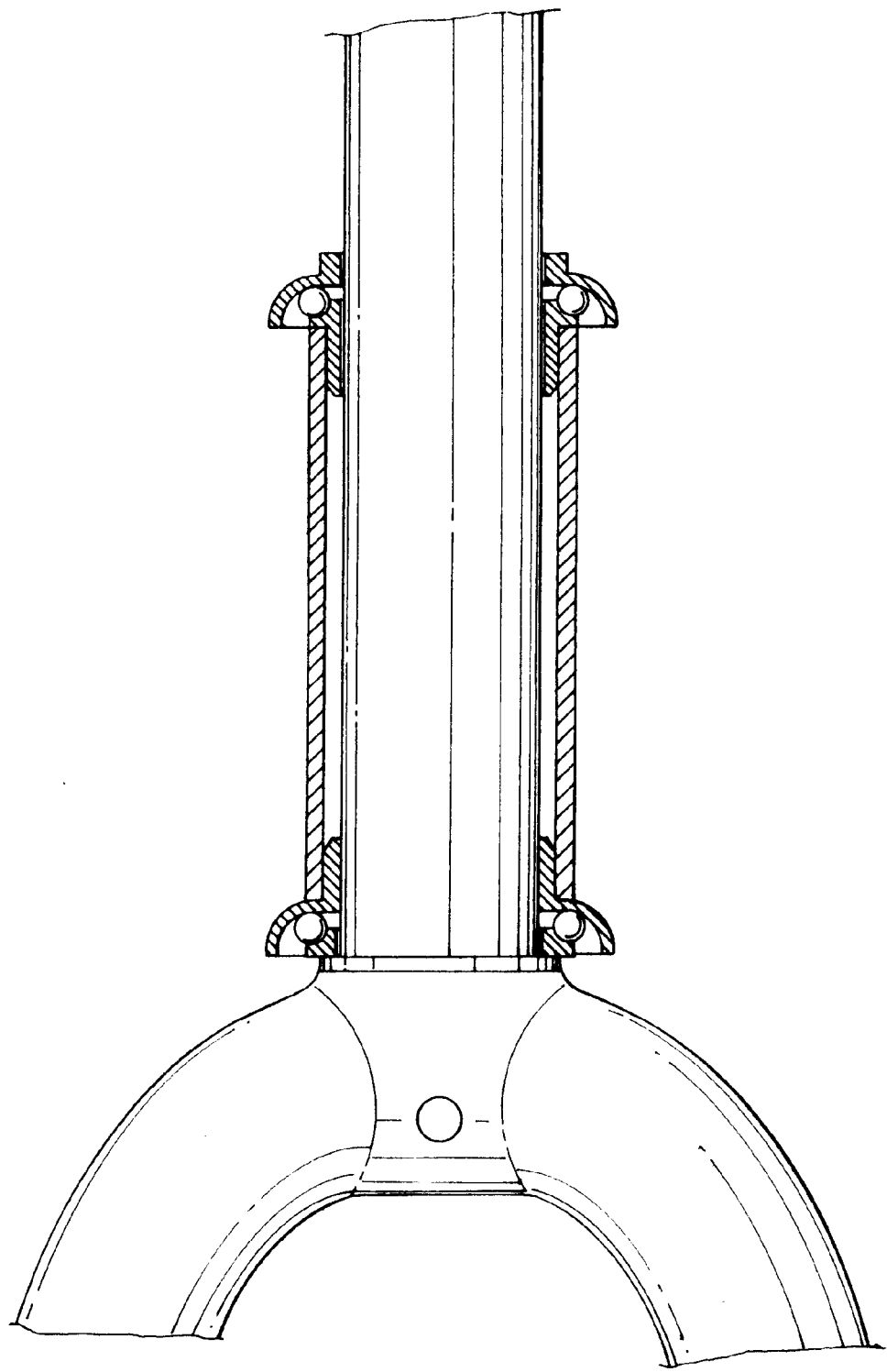
FIG. 1 shows a bicycle head tube packing arrangement installed according to the prior art.
Figure 2:
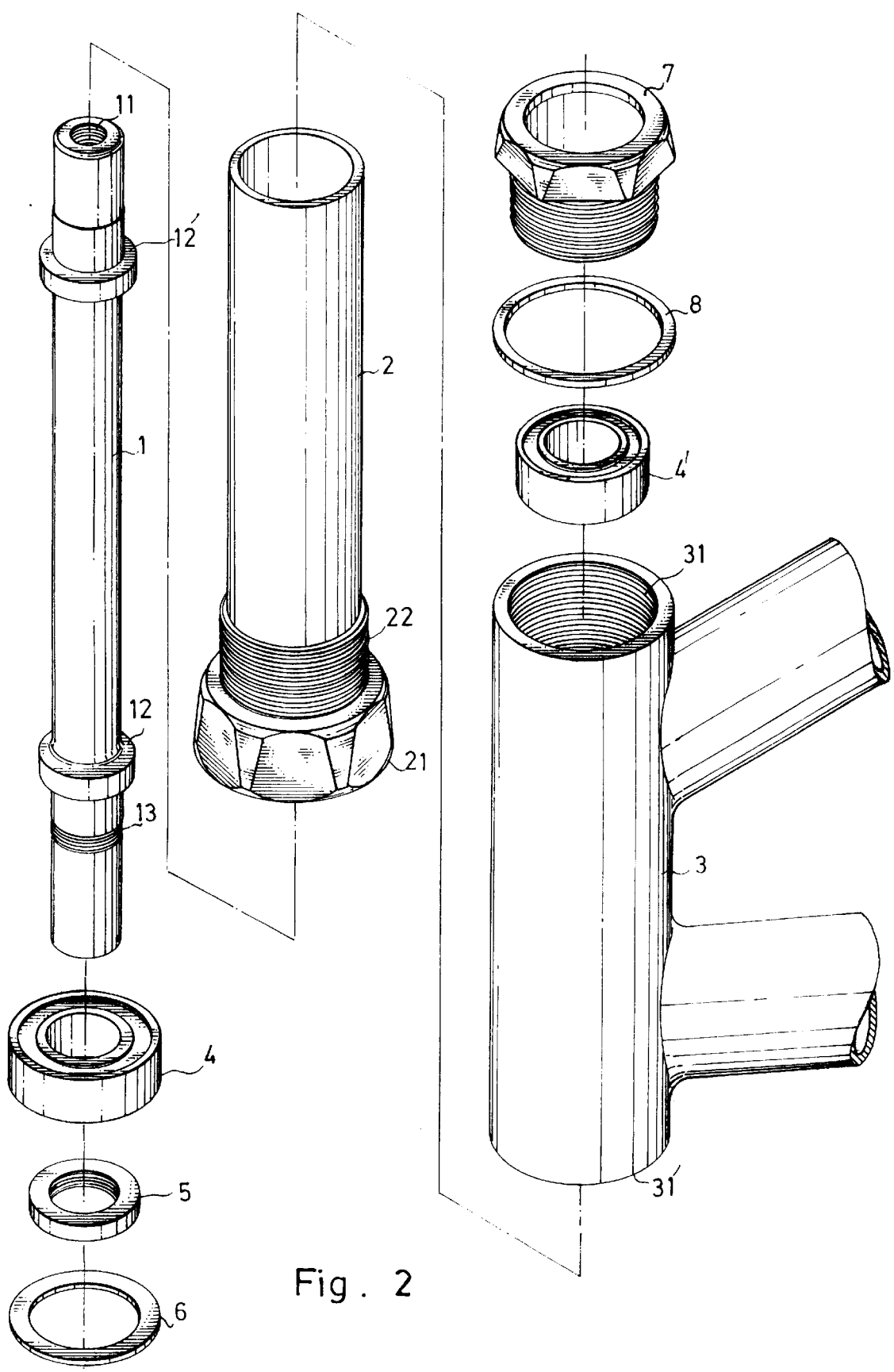
FIG. 2 is an exploded view of a bicycle head tube packing arrangement according to the present invention.

Referring to FIG. 2, a bicycle head tube packing arrangement in accordance with the present invention is generally comprised of a tubular shaft 1, a sleeve 2, a head tube 3, a first axle bearing 4, a second axle bearing 4', a nut 5, a first packing ring 6, a second packing ring 8, and a hollow top cap 7. The tubular shaft 1 has inner threads 11 at top and bottom ends thereof for fastening to a handlebar stem 10 and a front fork 9 (see also FIG. 4), a lower collar 12 and an upper collar 12' raised around the periphery near its both ends, and an outer thread 13 near its bottom end below the first collar 12. The sleeve 2 has a hexagonal head 21 at one end defining a step 23 on the inside, and an outer thread 22 around the periphery above the hexagonal head 21. The head tube 3 has a first inner thread 31' at the bottom, and a second inner thread 31 at the top.

Figure 3:
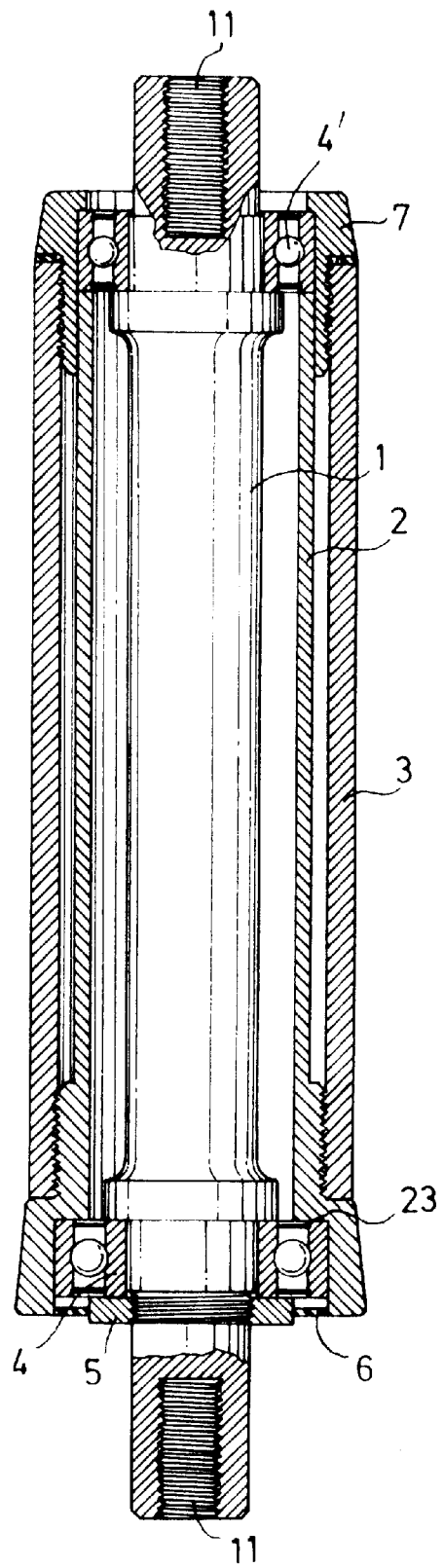
FIG. 3 is a sectional assembly view of the bicycle head tube packing arrangement shown in FIG. 2.
Figure 4:
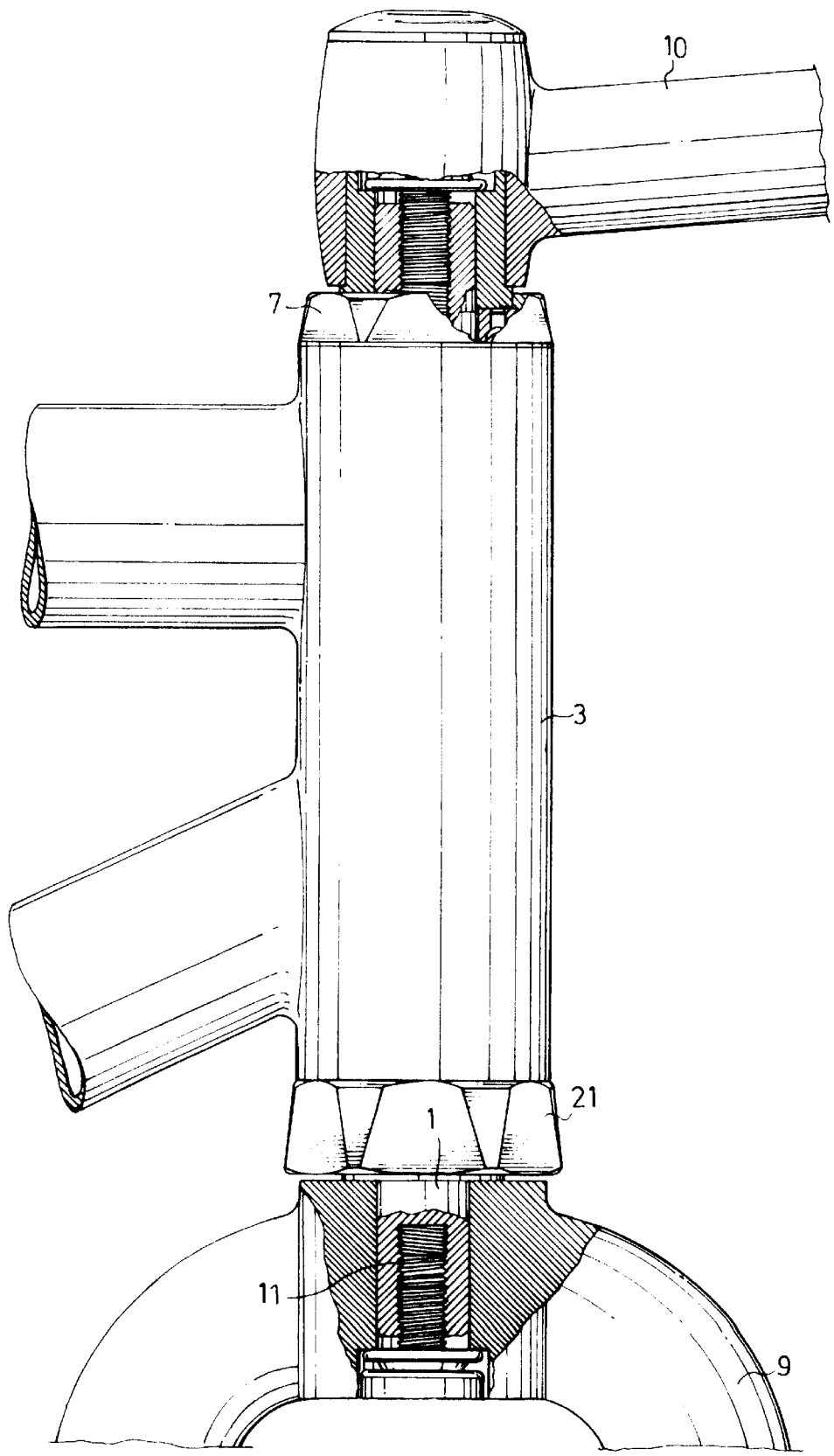
FIG. 4 shows the present invention installed.

Referring to FIGS. 2, 3 and 4, and FIG. 1 again, the sleeve 2 is inserted through the head tube 3 from the bottom and then fastened thereto by threading the outer thread 22 into the first inner thread 31' of the head tube 3. The tubular shaft 1 is inserted through the sleeve 2 with its top and bottom ends respectively fastened to the handlebar stem 10 and the front fork 9. The hollow top cap 7 is a screw cap threaded into the second inner thread 31 at the top of the head tube 3 to hold the second axle bearing 4' on the upper collar 12' of the tubular shaft 1 above the sleeve 2. The second packing ring 8 is retained between the top cap 7 and the topmost edge of the head tube 3. The nut 5 is threaded onto the outer thread 13 on the tubular shaft 1 to hold the first axle bearing 4 in place. The first axle bearing 4 is mounted around the tubular shaft 1 and stopped at the lower collar 12 of the tubular shaft 2 and the step 23 inside the hexagonal head 21 of the sleeve 2. The first packing ring 6 is mounted within the hexagonal head 21 of the sleeve 2 around the nut 5, and retained between the first axle bearing 4 and a part of the front fork 9.

Figure 5:
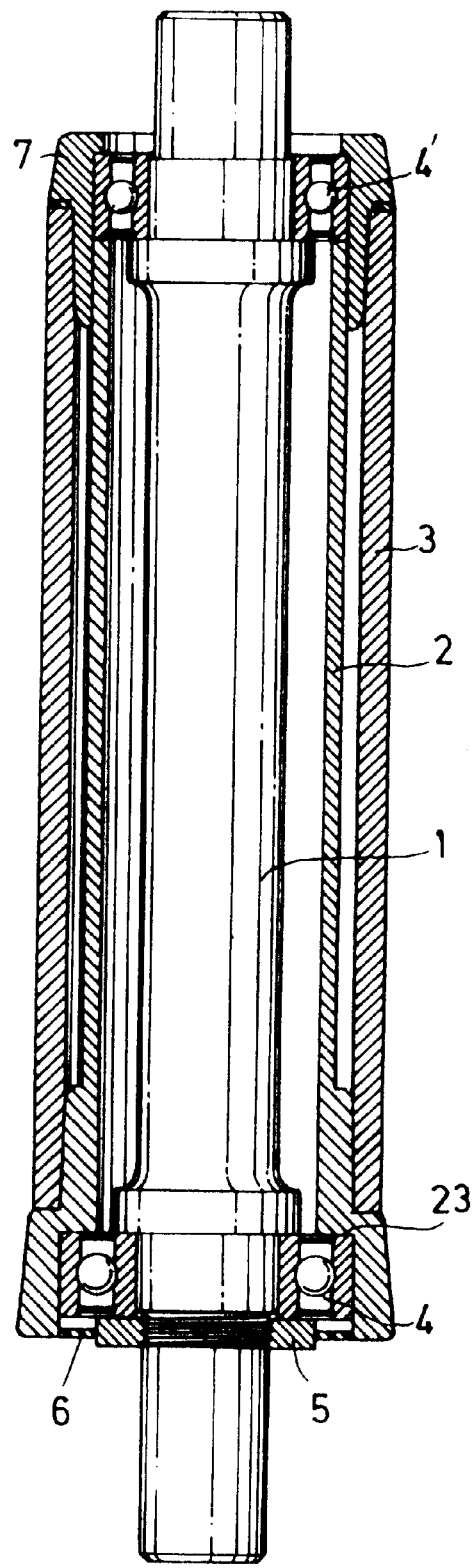
FIG. 5 is a sectional view of an alternate form of the present invention.

FIG. 5 shows an alternate form of the present invention in which the connection between the top cap 7 and the top end of the head tube 3 as well as the connection between the sleeve 2 and the bottom end of the head tube 3 are respectively achieved by fitting the respective tapered outside wall portions of the top cap 7 and the sleeve 2 into respective tapered inside wall portions at both ends of the head tube 3.

I claim:

1. A bicycle head tube packing arrangement comprising:
   a head tube having a first inner thread at a bottom end thereof, and a second inner thread at a top end thereof;
   a sleeve inserted into said head tube, said sleeve having a hexagonal head at a bottom end thereof stopped outside the bottom end of said head tube and an outer thread threaded into the first inner thread of said head tube, said hexagonal head defining an inside step;
   a tubular shaft inserted through said sleeve, said tubular shaft having a first inner thread at a top end thereof connected to a handlebar stem and a second inner thread at a bottom end thereof connected to a front fork, a lower collar and an upper collar raised around the periphery near both ends, and an outer thread at the bottom end below said lower collar;
   a hollow screw cap threaded into the second inner thread at the top end of said head tube;
   a nut threaded onto the outer thread on said tubular shaft;
   a first axle bearing mounted around said tubular shaft and stopped at the lower collar of said tubular shaft and the inside step of said hexagonal head of said sleeve;
   a first packing ring mounted within said hexagonal head of said sleeve around said nut, and retained between said first axle bearing and a part of said front fork;
   a second axle bearing mounted around said tubular shaft and held down on said upper collar of said tubular shaft above said sleeve by said hollow screw cap; and
   a second packing ring retained between said hollow screw cap and said head tube.

* * * * *